No. 718,727. PATENTED JAN. 20, 1903.
G. POTSTADA.
SPLIT COLLAR FOR SHAFTS.
APPLICATION FILED NOV. 15, 1902.
NO MODEL.

Witnesses:
J. D. Garfield
M. S. Crosier

Inventor:
Georg Potstada
by Chipin&&
Attorneys

UNITED STATES PATENT OFFICE.

GEORG POTSTADA, OF HOLYOKE, MASSACHUSETTS.

SPLIT COLLAR FOR SHAFTS.

SPECIFICATION forming part of Letters Patent No. 718,727, dated January 20, 1903.

Application filed November 15, 1902. Serial No. 131,557. (No model.)

*To all whom it may concern:*

Be it known that I, GEORG POTSTADA, a subject of the German Emperor, residing at Holyoke, in the county of Hampden and State of Massachusetts, have invented new and useful Improvements in Split Collars for Shafts, of which the following is a specification.

This invention relates to split couplings or collars, the object of the invention being to provide a device of this kind which will permit it to be applied to a shaft at any point on the latter without necessitating slipping it on over the end of the shaft and so constructed as to permit the collar to be secured to said shaft without the aid of set-screws or like devices.

The invention consists in the construction described in the following specification and carefully pointed out in the claims, and in the accompanying drawings the invention is clearly illustrated.

Figure 1:
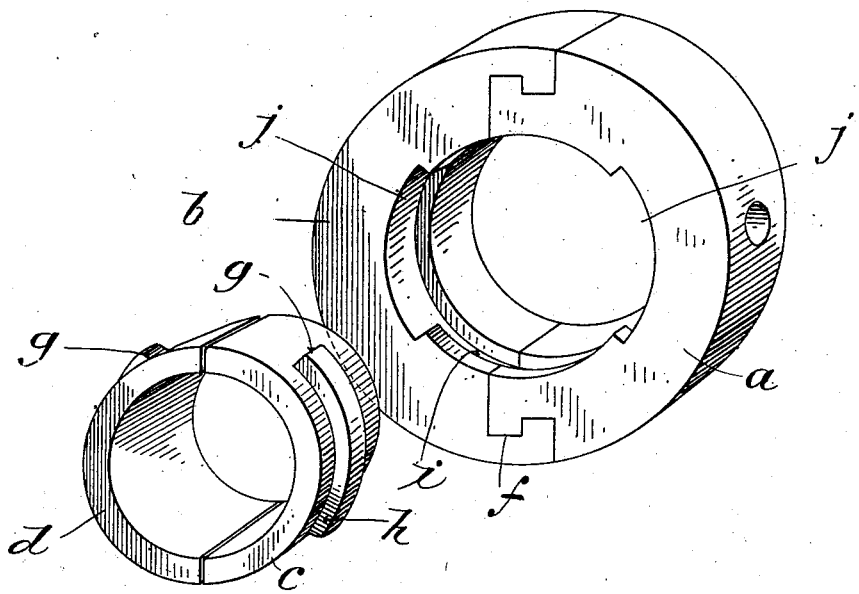
Figure 2:
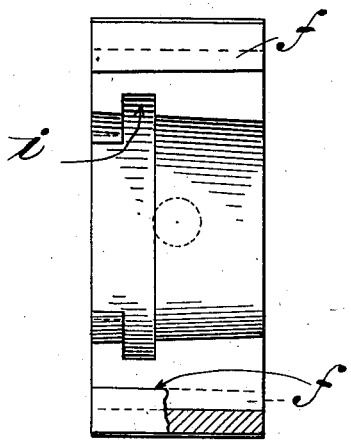

Figure 1 is a perspective view of the device, certain parts thereof being shown in separated relation thereto. Fig. 2 is a plan view of the interior of one half of the collar; and Fig. 3 is a view of the other half of the collar, showing the compression-bushing therein and showing also a piece of shafting to which the other parts have been applied.

Referring now to the drawings, $a$ indicates one part of a split collar. $b$ indicates the other part thereof. $c$ indicates one part of a split bushing, and $d$ indicates the other part thereof. These parts of the bushing are assembled as shown in Fig. 1 and are adapted to encircle a shaft $e$, as shown in plan view in Fig. 3. When located on a shaft, the contiguous edges of the two parts of the bushing are not quite in contact. This bushing interiorly is of uniform diameter from one end to the other; but exteriorly its surface is tapered, as shown particularly in Fig. 3. The interior of the collar when the two parts are interlocked, as shown in Fig. 1, is tapered to the same degree as is the surface of the bushing.

Figure 3:
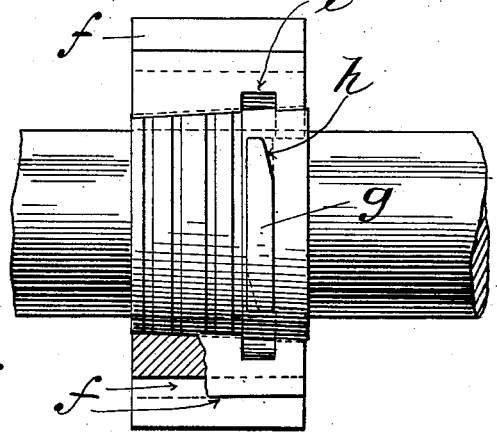

Both the bushing and the collar are split in a line parallel with their axes, and the abutting edges of the collar parts have interlocking grooves and tenons, (indicated by $f$,) which are also slightly tapered, as shown in Figs. 2 and 3, whereby when these parts are interlocked by being slid one into the other with an endwise movement they will come to a stop with their ends in the same plane.

On each of the bushing parts $d$ and $c$ is a rib $g$, the end of each of which ribs, as at $h$, is tapered to form a wedge-shaped end. Within the two parts of the collar there is turned an annular groove having rectangular sides, said grooves being indicated by $i$ and adapted to receive the ribs $g$ on the bushing parts when these latter are in position within the collar, as in Fig. 3. In order to permit the location of the bushing within the collar parts, as shown in this figure, two portions $j$, one on each of said collar parts, are cut from one end into said grooves $i$, these cut-away parts $j$ being substantially equal in length to the ribs $g$. The groove $i$ is turned in both collar parts at once, while the latter are secured together; but the openings $j$, extending into this groove, break its continuity on one side and provide an open-ended groove in each collar part wherewith the said ribs $g$ may engage. The groove $i$ is somewhat wider than the rib $g$.

The diameters of the exterior of the bushing and of the interior of the collar parts are so proportioned that when the bushing has been applied to a shaft and the two collar parts locked together have been slid onto the bushing in such manner that the ribs $g$ will be located within the grooves $i$ the bushing will have come to a bearing within the collar more or less intimate, and the bushing will also be compressed about the shaft tightly enough to prevent it from slipping if a spanner or any other means for rotation then be applied to the collar parts $a$ and $b$ and the latter be rotated against the inclined end of the ribs $g$, and the bushing and said collar parts will have imparted thereto mutual endwise movements in opposite directions, the bushing almost instantly coming to a firm bearing on the shaft and the collar parts being drawn up on the tapered bushing with great force, locking all the parts together and to the shaft.

To apply the collar to a shaft at any desired point, the two bushing parts are placed on the shaft, and then either the part $a$ or $b$ of the collar may be applied to one of the bushing parts in the relative position thereon which it will finally occupy, and the other part of the collar may then be slid into engagement therewith, and this second part of the collar will be so guided, of course, that the rib $g$ on the bushing will pass through the cut-away part $j$ as this collar part is moved into position. The rotation of the parts then secures the device to the shaft.

From the above construction it is apparent that a collar can be applied to a shaft anywhere without uncoupling the shaft to slip it on and that the collar can be securely locked thereto without the use of a set-screw, the protecting-head of which is, as well known, a source of great danger.

Having thus described my invention, what I claim, and desire to secure by Letters Patent of the United States, is—

1. The combination with an exteriorly-tapered split bushing, of a collar consisting of two interlocking parts adapted to be moved endwise over said bushing to constrict the latter, and means of engagement between said collar and bushing, whereby the rotation of one relative to the other will effect said endwise movement.

2. The combination with an exteriorly-tapered split bushing, of a collar consisting of two interlocking parts adapted to be moved endwise over said bushing to constrict the latter, a wedge-shaped rib on each bushing part, and a groove in each collar part with which said ribs may engage, whereby the relative rotation of the collar and bushing will effect the constriction of said bushing.

3. A split collar consisting of two interlocking interiorly-tapered parts, there being a groove in the interior surface of each of said parts substantially at right angles to the axis thereof and there being an opening from one end of said collar parts into said groove; a split bushing exteriorly tapered, a rib or projection on each part of said bushing to engage with said grooves, and means whereby the rotation of said collar parts will impart endwise movement thereof, relative to the bushing, to constrict the latter.

GEORG POTSTADA.

Witnesses:
WILLIAM H. CHAPIN,
K. I. CLEMONS.